June 6, 1967 R. R. ROVER, JR 3,324,471
IMAGE PRODUCING APPARATUS WITH DEVIATION INDICATION
Filed June 29, 1964 2 Sheets-Sheet 1

ON GLIDE SLOPE-ON LOCALIZER

LOW-LEFT

ON GLIDE SLOPE-LEFT

INVENTOR.
RALPH R. ROVER JR.
BY
ATTORNEY

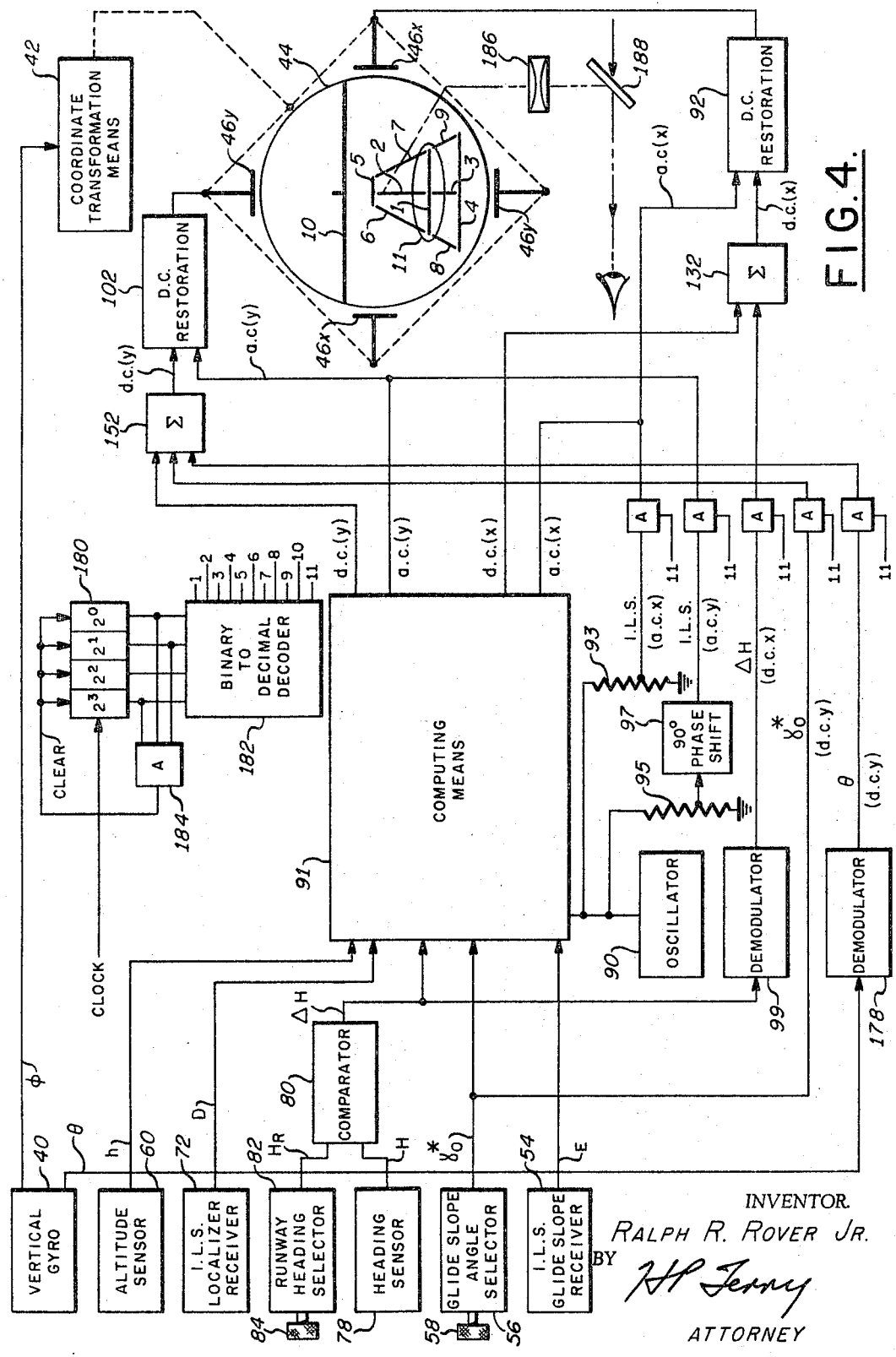

United States Patent Office 3,324,471
Patented June 6, 1967

3,324,471
IMAGE PRODUCING APPARATUS WITH
DEVIATION INDICATION
Ralph R. Rover, Jr., Cresskill, N.J., assignor to Sperry
Rand Corporation, Great Neck, N.Y., a corporation of
Delaware
Filed June 29, 1964, Ser. No. 378,928
7 Claims. (Cl. 343—108)

The present invention relates to apparatus for providing to a pilot a composite image representative of the real world and deviations from a reference position on the windshield of the craft.

Windshield projection displays are intended to provide the pilot with the information which he requires in a natural form preferably superimposed on the actual external view. Windshield projection displays of this type overcome the basic deficiencies in present cockpit panel display presentations and are particularly well suited for all-weather landing. Windshield projection displays, for example, of the type disclosed in U.S. patent application 164,769 entitled "Image Producing Apparatus" of Curry et al. filed Jan. 8, 1962, now U.S. Patent No. 3,237,193 issued Feb. 22, 1966, permit collimated virtual images at optical infinity to be projected within the pilot's field of view as he looks through the windshield of the aircraft. This technique was improved in my copending U.S. patent application S.N. 374,717 entitled, "Runway Image Generating Apparatus," filed June 12, 1964, which permits the superposition of information on the pilot's external visual field in a form that is compatible with his view through the windshield, for example, a runway image is superimposed upon the real world runway. This information is visible to the pilot by day or night and the windshield display is effectively free of parallax effects between the projected image and the real world.

A preferred form of runway image as disclosed by said patent application S.N. 374,717 embodies an inverted Latin cross bounded by a four sided figure, the longer of the two crossing bars of the cross being representative of a runway center line while the point of intersection of the bars is an aim point toward which the craft is controlled to land. The shorter of the two crossing bears is a runway threshold marker and it indicates the start of the portion of the runway which is actually used for landing purposes.

The present invention is a continuation-in-part of said patent application S.N. 374,717 and utilizes an oval or ellipse coordinated with respect to the aim point formed by the intersection of the cross bars of the inverted Latin cross to produce an image for indicating to the pilot his angular deviations from the on-course position measured at the aim point. The present invention is an improvement over and may be utilized with the aforementioned systems as well as the apparatus disclosed in copending application S.N. 240,836, now Patent No. 3,242,493.

It is a principal object of the present invention to provide improved windshield projection display systems.

It is another object of the present invention to provide a windshield projection display compatible with real world images while providing deviation indications familiar to pilots.

It is a further object of the present invention to provide a windshield projection display for aiding all-weather landings in which pilots have confidence due to projection experience with real world compatible images and cockpit instrumentation displays. The above objects are accomplished by the present invention by utilizing a windshield projection display in which the runway image represents the real runway and is consonant with the latter in both orientation, perspective and retinal size. Therefore, the runway image overlays the real runway when visibility conditions permit the pilot to see the runway. The aim point represents the intersection of the reference path for final approach (ILS on-course) with the runway. The horizontal line on the runway through the aim point is the intersection of the glide slope plane with the ground. The extension of the runway centerline and the runway edges all intersect the horizon line at the base of the heading index in accordance with principles of perspective. Further, a deviation image in the form of an oval is cooperative with the runway image for indicating to the pilot his angular deviations from the on-course position measured with respect to the aim point. The deviation image utilizing the portion of the cross bars of the inverted Latin cross within the oval in effect transforms the projection display to one emanating from the aim point with equal Instrument Landing System (ILS) localizer and glide slope sensitivities. The projection display provided by the present invention is thus one with which the pilot has had experience by means of prior training under visual flight conditions and with conventional cockpit mounted deviation indicators.

These and other objects of the present invention will become apparent by referring to the drawings and accompanying description wherein:

FIG. 4 is a schematic block wiring diagram of an apparatus incorporating the present invention.

Figure 1:
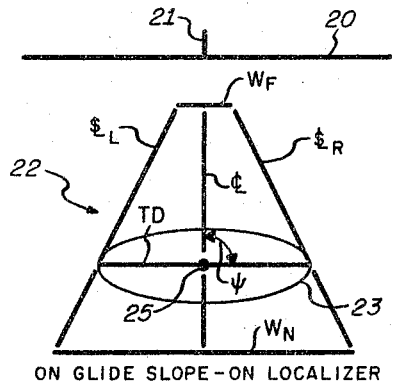
FIG. 1 shows a typical windshield projection display incorporating the oval deviation image of the present invention when the aircraft is on-course.

Since the present invention is an improvement on the windshield projection apparatus of the aforementioned patent application S.N. 374,717, the same terminology as well as certain reference characters will be utilized herein to designate common elements for purposes of simplifying the description. The present invention will be described as utilized with the system shown in said U.S. patent application S.N. 374,717 although it will be appreciated that it is also applicable to other types of windshield projection systems.

Referring to FIG. 1, the windshield projection display of the present invention includes a horizon line 20 having a vertical heading index 21 both of which are displaced with respect to a reference location on a cathode ray tube (C.R.T.) in proportion to craft pitch attitude $\theta$ as disclosed in said patent application S.N. 164,769. A runway image 22 and in particular the aim point 25 is positioned below the horizon line 20 in proportion to a quantity B equal to the sum of a signal $\gamma_o^*$ representing the angle that the ILS radio-defined glide slope makes with respect to the earth and a signal E provided by the craft Instrument Landing System (ILS) glide slope receiver. Displacement of the runway image 22 and in particular the arm point 25 parallel to the horizon line 20 is in proportion to the sum of a signal $\Delta H$ representing the craft heading with respect to the runway heading and a signal A derived from a signal D provided by the craft Instrument Landing System localizer receiver. Craft roll $\phi$ causes all traces of the C.R.T. to rotate proportionately about the axis of the tube. A runway threshold line TD and a runway center line ₵ together form an inverted Latin cross as taught by said copending application S.N. 378,927 now U.S. Pat. No. 3,305,865. The inverted Latin cross is bounded by lines $₵_L$, $₵_R$, $W_N$ and $W_F$ to form a four-sided runway image as disclosed by copending application S.N. 374,717 where $₵_L$ represents the left side of the runway, $₵_R$ the right side, $W_N$ the near end, and $W_F$ the far end. The manner of computing the angle $\psi$ that the runway center line ₵ makes with respect to the threshold line TD is taught by copending application S.N. 164,769. Collimating the light from the cathode ray tube images and directing same to the eyes of a pilot so as to provide a runway image overlay constitutes the invention taught by copending application S.N. 164,769. The runway image lines 22 subtend various angles with the ordinates X—X and Y—Y being representative of the C.R.T. beam deflection circuits employed for generation of the image in the manner described in said patent application S.N. 374,717.

In accordance with the present invention, an ILS limit or deviation marker preferably in the form of an oval 23 is superimposed upon and cooperative with the runway image 22. The position of the center of the oval 23 is displaced laterally from the C.R.T. center line in an amount proportional to the heading error $\Delta H$ with respect to the X—X channel of the C.R.T. and vertically below the C.R.T. reference line (not shown) in an amount porportional to the reference glide slope angle $\gamma_0^*$ and the pitch $\theta$ of the aircraft with respect to the Y—Y channel of the C.R.T. The scaling of these D.C. positioning voltages is adjusted to result in a 1 to 1 angular relationship with the real world with aircraft attitude changes. The height of the oval 23 is normally adjusted to the normal full scale glide slope displacement, i.e., $\pm \frac{1}{2}°$ nominally by adjusting an ILS A.C. voltage on the Y—Y channel and the width of the oval 23 is normally adjusted to correspond to a maximum lateral displacement tolerable at a particular altitude, for example, one-half the major axis of the oval being adjusted to be equal to the maximum tolerable displacement at 200 feet altitude by adjusting the ILS A.C. signal applied to the X—X channel of the C.R.T., all in a manner to be more fully described.

As shown in FIG. 1, the oval ILS limit or deviation marker 23 is the means for indicating to the pilot his angular deviations from the on-course condition measured at the aim point 25. This presentation in effect transforms the guidance system to an optical one emanating from the aim point 25 with equal localizer and glide slope sensitivities which provides a symmetrical presentation when the aircraft is on the proper heading, on the glide slope and on localizer as shown in FIG. 1.

Figure 2:
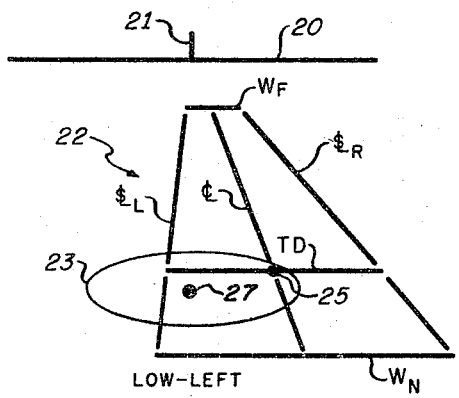
FIG. 2 is similar to FIG. 1 when the aircraft is low and to the left of the on-course position.
Figure 3:
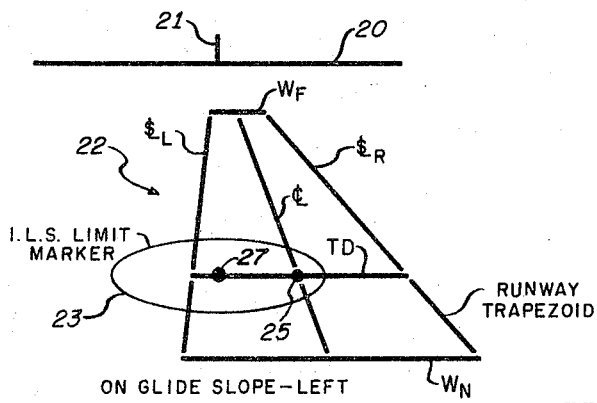
FIG. 3 is similar to FIG. 1 when the aircraft is on the glide slope and to the left of the on-course position.

The position of the center 27 of the oval 23 in relation to the aim point 25 represents the angular deviation of the aircraft from the on-course condition in both azimuth and elevation. The displacement of the center 27 of the oval 23 from the aim point 25 as shown in FIGS. 2 and 3 also represents the linear deviation of the aircraft from the on-course condition to the same scale as the runway image 22 is presented. For example, if the center 27 of the oval 23 is disposed on one edge of the runway image 22, the aircraft would be displaced from the on-course condition by one-half the width of the runway.

As shown in FIG. 2, the display indicates the aircraft is on the proper heading but is low and to the left of the on-course position whereas in FIG. 3 the aircraft is on the proper heading and on the glide slope but to the left of the localizer beam which defines the center line of the runway.

Referring to FIG. 4, a vertical gyroscope 40, provides A. C. signals $\phi$ and $\theta$ representing respectively aircraft roll and pitch attitudes with respect to a reference attitude and applies the roll signal $\phi$ to a coordinate transformation means 42 which operates to rotate images appearing on the face of a cathode ray tube 44 about the axis of the tube. Here, for ease of understanding the C.R.T. axis and the craft longitudinal axis are assumed aligned. The coordinate transformation means 42 is shown as a servomotor mechanically linked to rotate electrostatic deflection plates 46X and 46Y of the cathode ray tube 44 about its axis. The runway image 22 and the horizon line 20 are provided in a manner more fully described in said patent application S.N. 374,717 wherein an ILS glide slope receiver 54 provides a D.C. output signal E representative of the angular displacement of the aircraft from that defined course and a glide slope angle selector 56 provides a D.C. signal $\gamma_0^*$ representative of the angle that the radio-defined glide slope makes with respect to the earth that is settable by means of a knob 58. Further, an altitude sensor 60 provides an altitude signal $h$ and an ILS localizer receiver 72 provides a D.C. signal D representative of the craft angular displacement with respect to the real world runway center line course.

A heading sensor 78, which may be a gyromagnetic compass system, applies its A.C. output signal H to a comparison device 80 connected to receive an A.C. output signal $H_R$ from a runway heading selector 82. The runway heading selector 82 is adapted to be set by means of a knob 84 to provide an A.C. output signal representing the heading of the real world runway onto which it is desired to land. The comparison device 80 provides an A.C. signal $\Delta H$ representative of the instantaneous heading of the craft with respect to the heading of the runway. An oscillator 90 provides an A.C. excitation signal to a computing means 91.

In accordance with the teachings of said patent application Ser. No. 374,717, the aforementioned signal generators provide respective signals which are processed in the computing means 91 for providing composite A.C. and D.C. output signals for generating the horizon and runway images. Thus, a summing element 132 responsive to D.C. $(x)$ signals from the computing means 91 provides a resultant D.C. $(x)$ signal to a D.C. restoration element 92. The computing means 91 also provides an A.C. $(x)$ signal to the D.C. restoration element 92. Similarly, an A.C. $(y)$ signal is provided from the computing means 91 to the D.C. restoration element 102 while the summing element 152 which is responsive to D.C. $(y)$ signals from the computing means 91 provides a resultant D.C. $(y)$ signal to the D.C. restoration element 102. The D.C. restoration element 92 is connected to the X axis deflection plates 46X while the D.C. restoration element 102 is connected to the Y axis deflection plates 46Y of the cathode ray tube 44 to provide the horizon and runway images, all as explained in said U.S. patent application Ser. No. 374,717.

As explained in said application Ser. No. 374,717 the computing means 91 includes a logic circuit for controlling the time sharing of the desired traces on the face of the cathode ray tube 44 to provide a composite image to the pilot.

In accordance with the present invention in order to provide the oval deviation image 23, two sinusoidal voltages 90° out of phase with respect to each other are multiplexed to provide a Lissajous figure in the form of the desired oval 23. This may be accomplished by connecting the output of the oscillator 90 through a potentiometer 93 which is suitably tapped to provide an A.C. signal ILS A.C. $(x)$ which is then connected through an extension of the logic circuit to the A.C. $(x)$ input terminal of the D.C. restoration element 92. Similarly, the oscillator 90 is connected through a potentiometer 95 that is tapped to provide an A.C. signal ILS A.C. $(y)$ which is then connected through a 90° phase shifter 97 to provide a 90° phase shifted A.C. signal ILS A.C. $(y)$ through a portion of the logic circuit to the A.C. $(y)$ input terminal of the D.C. restoration element 102. The ILS A.C. $(x)$ signal defines the width of the oval 23 and it is normally adjusted by means of the tap on potentiometer 93 to correspond to a maximum lateral displacement tolerable at a particular altitude. The ILS A.C. $(y)$ signal which defines the height of the oval 23 is normally adjusted to correspond to the normal full scale glide slope displacement $\pm \frac{1}{2}°$.

The position of the center of the oval 23 is defined laterally from the C.R.T. center line in proportion to the heading error $\Delta H$, which signal is provided from the output of the comparator 80 and connected through a demodulator 99 and through a portion of the logic circuit to an input terminal of the summation element 132. The position of the center of the oval 23 is defined vertically below the C.R.T. center line as a function of the reference glide slope angle $\gamma_o{}^*$ and the pitch $\theta$ signals. The reference glide slope angle signal $\gamma_o{}^*$ is provided from the glide slope angle selector 56 and applied through the logic circuit to an input terminal of the summation element 152. The pitch angle signal $\theta$ is provided from the vertical gyro 40, demodulated in a demodulator 178 and applied through the logic circuit to another input terminal of the summation element 152. The heading error $\Delta H$, the pitch $\theta$ and reference glide slope $\gamma_o{}^*$ signals are all D.C. positioning voltages and the scaling of these voltages is adjusted to result in a 1 to 1 angular relationship with the real world during aircraft attitude changes.

The face of the cathode ray tube 44 is shown in FIG. 4 displaying an image comprising ten distinct numbered straight lines 1–10 (disjoined intentionally for purposes of clarity) and an oval 11, which numbers indicate the order in which the cathode ray tube deflection circuits are time-shared for respective line generation. To provide an eleven-step time-sharing operation, a four-stage counter 180 receives a clock pulse and applies its binary output to a binary-to-decimal decoder 182 having eleven output leads which are successively excited. When the counter 180 stores the binary equivalent of decimal 11, i.e. a $2^3$, $2^1$, and $2^0$, and AND gate gate circuit 184 applies a CLEAR pulse to the counter 180, whereby the decoder output leads 1–11 are again successively excited as a result of the clock pulses. The logic circuit comprises suitably arranged AND gate circuits having respective input leads designated by the numerals 1–11 to indicate the decoder 182 output leads to which they are respectively connected, only input 11 being shown for purposes of simplicity.

The light from the display which appears on the face of the cathode ray tube 44 is shown being collimated by a lens 186 and directed to the eyes of a pilot via a semi-transparent combining glass 188 in accordance with the teaching of copending application Ser. No. 164,769.

The operation of the system to provide the C.R.T. traces representing the horizon line and runway images have been explained in said patent application Ser. No. 374,-717 and therefore only the operation of the system to develop the oval 23 will now be described. Upon excitation of the lead 11 of the decoder 182, the AND gates connect the oval defining signals ILS A.C. ($x$) and ILS A.C. ($y$) to the X and Y deflection plates via the D.C. restorers 92 and 102 respectively. The AND gates further connect the horizontal oval positioning signal $\Delta H$ to the 46X deflection plate via the summer 132 and restorer 92 and the vertical oval positioning signals $\theta$ and $\gamma_o{}^*$ to the 46Y deflection plate via the summer 152 and restorer 102. The magnitude of the signals are adjusted as explained above to position the center 27 of the oval 23 laterally from the C.R.T. center line proportional to the heading error $\Delta H$ and vertically below the C.R.T. center line proportional to the pitch $\theta$ and reference glide slope angle $\gamma_o{}^*$. This image now provides a reference for determining both lateral and vertical displacement information. In fact, the position of the intersection of the runway center line ₵ and the threshold line TD within the oval 23 correspond directly to the displacement information as presented on a standard panel mounted deviation indicator.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Aircraft instrument apparatus for aiding a pilot in landing an aircraft on a runway having a reference landing system comprising,
   (a) means responsive to the position and attitude of said aircraft with respect to said runway for providing a first image representative of said runway in said pilot's normal field of view,
   (b) means for providing a second image representative of the deviation limits defined with respect to said reference landing system in said pilot's normal field of view, and
   (c) means for relatively positioning said first and second images with respect to each other for providing a realistic composite representation of said runway and the deviation limits with respect to said runway as viewed from said aircraft and in said pilot's normal field of view in which said first image includes an inverted Latin cross formed by first and second intersecting traces representative of the center line of said runway and the threshold of said runway respectively and said second image is an oval having major and minor axes representative of the lateral and vertical deviation limits and said means for relatively positioning said first and second images with respect to each other provides a composite representation of said first and second images whereby the presentation within said oval is representative of a deviation indication.

2. Aircraft instrument apparatus for aiding a pilot in landing an aircraft on a runway having a radio-defined landing system comprising,
   (a) a cathode ray tube,
   (b) means for providing a first image on the face of said cathode ray tube representative of said runway,
   (c) means responsive to the position and attitude of said aircraft with respect to said runway for positioning said first image to provide a realistic representation of said runway,
   (d) means for providing a second image on the face of said cathode ray tube in the form of an oval having major and minor axes which define lateral and vertical deviation limits respectively with respect to said runway, and
   (e) means for relatively positioning said first and second images with respect to each other for providing a realistic composite representation of the desired aim point on the runway and the actual deviation therefrom.

3. Apparatus of the character described in claim 2 in which said second image is positioned with respect to the aircraft heading and pitch and the reference intersection angle as defined by said radio-defined landing system.

4. Apparatus of the character described in claim 2 further including means for transmitting said realistic composite representation into said pilot's normal field of view for superimposing said representation upon the real world view.

5. Aircraft instrument apparatus for aiding a pilot in landing an aircraft on a runway having a radio-defined landing system comprising,
   (a) a cathode ray tube,
   (b) means for providing a first image on the face of said cathode ray tube representative of said runway and being formed by an inverted Latin cross bounded by four sides wherein the intersection of said Latin cross defines an aim point for landing,
   (c) means responsive to the position and attitude of said aircraft with respect to said runway for positioning said first image to provide a realistic representation of said runway,
   (d) means for providing a second image on the face of said cathode ray tube in the form of an oval having major and minor axes which define lateral and vertical deviation limits respectively with respect to said runway from said aim point, and
   (e) means for relatively positioning said first and second images with respect to each other for providing a realistic composite representation of said aim point on the runway as defined by the intersection of said inverted Latin cross and the actual deviation therefrom.

6. Apparatus of the character described in claim 5 in which said second image is positioned with respect to the aircraft heading and pitch and the reference intersection angle as defined by said radio-defined landing system.

7. Apparatus of the character described in claim 5 further including means for transmitting said realistic composite representation into said pilot's normal field of view for superimposing said representation upon the real world view.

References Cited
UNITED STATES PATENTS 2,649,581  8/1953  Tasker et al.
3,237,193  2/1966  Curry et al. _____ 343—108

RODNEY D. BENNETT, *Primary Examiner.*

CHESTER L. JUSTUS, *Examiner.*

B. L. RIBANDO, *Assistant Examiner.*